(12) United States Patent
Mamada et al.

(10) Patent No.: US 8,365,855 B2
(45) Date of Patent: Feb. 5, 2013

(54) CONSTRUCTION MACHINE

(75) Inventors: Tomonori Mamada, Kazo (JP); Hiroshi Kumagai, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 235 days.

(21) Appl. No.: 12/812,244

(22) PCT Filed: May 28, 2009

(86) PCT No.: PCT/JP2009/059778
§ 371 (c)(1),
(2), (4) Date: Jul. 9, 2010

(87) PCT Pub. No.: WO2010/013537
PCT Pub. Date: Feb. 4, 2010

(65) Prior Publication Data
US 2010/0283278 A1 Nov. 11, 2010

(30) Foreign Application Priority Data
Jul. 31, 2008 (JP) .................................. 2008-197823

(51) Int. Cl.
*B60K 11/00* (2006.01)
(52) U.S. Cl. ...................... 180/68.1; 180/312; 180/89.12
(58) Field of Classification Search .................. 180/312, 180/299, 68.1, 69.2, 69.24, 89.1, 89.17, 89.12; 290/190.09, 65.06, 68.1; 903/903, 907
See application file for complete search history.

(56) References Cited

U.S. PATENT DOCUMENTS

| | | | | |
|---|---|---|---|---|
| 3,860,090 A * | 1/1975 | Flanary | ............................ | 184/7.2 |
| 6,296,436 B1 * | 10/2001 | Ramun | ............................ | 414/719 |
| 6,678,972 B2 * | 1/2004 | Naruse et al. | ............................ | 903/903 |
| 7,134,519 B2 * | 11/2006 | Imashige | ............................ | 180/69.24 |
| 7,279,801 B2 * | 10/2007 | Kagoshima | ............................ | 180/312 |
| 7,388,301 B2 * | 6/2008 | Komiyama et al. | ............................ | 180/312 |
| 7,654,601 B2 * | 2/2010 | Spellmeyer et al. | ............................ | 296/65.06 |
| 7,810,597 B2 * | 10/2010 | Imashige | ............................ | 180/69.2 |
| 7,900,996 B2 * | 3/2011 | Kimura et al. | ............................ | 296/190.09 |
| 2008/0223319 A1 | 9/2008 | Nakashima et al. | | |

FOREIGN PATENT DOCUMENTS

| | | |
|---|---|---|
| EP | 1 832 731 A1 | 9/2007 |
| JP | 9-195316 A | 7/1997 |
| JP | 2593645 Y2 | 2/1999 |
| JP | 11-193548 A | 7/1999 |
| JP | 2000-280760 A | 10/2000 |
| JP | 2002-61225 A | 2/2002 |
| JP | 3409559 B2 | 3/2003 |
| JP | 2004-3398 A | 1/2004 |
| WO | 2006/070733 A1 | 7/2006 |
| WO | 2008/065894 A1 | 6/2008 |

* cited by examiner

*Primary Examiner* — Hau Phan
(74) *Attorney, Agent, or Firm* — Mattingly & Malur, PC

(57) ABSTRACT

A space surrounded by a partition member (26) partitioning between an engine (8) and a heat exchanger (20), a top plate (21D) of a support frame (21) constituting the heat exchanger (20), and a top plate (13A) of an engine cover (13) is defined as an article accommodating space (30). In addition, an article box (32) where tools necessary for a maintenance operation are stored is accommodated in the article accommodating space (30). Thereby even in a hydraulic excavator (1) of a type having a small swing radius at the rear in which the engine (8) and a counterweight (7) are arranged close to each other, by effectively using a top surface side of the heat exchanger (20), it is possible to secure the article accommodating space (30) for accommodating an article such as the article box (32) in a housing cover (12).

7 Claims, 13 Drawing Sheets

CONSTRUCTION MACHINE

TECHNICAL FIELD

The present invention relates to a construction machine such as a hydraulic excavator or hydraulic crane, and particularly to a construction machine equipped with an openable and closable engine cover.

BACKGROUND ART

In general, a hydraulic excavator as a representative example of a construction machine is constituted by an automotive lower traveling structure, an upper revolving structure which is rotatably mounted on the lower traveling structure, and a working mechanism liftably mounted on a front side of the upper revolving structure, and a ground excavating operation is performed by lifting up and down the working mechanism.

The upper revolving structure is largely constituted by a revolving frame serving as a base frame, a cab located at a left front side of the revolving frame to define an operation room, a counterweight located in a rear end side of the revolving frame for keeping a weight balance with the working mechanism, and a housing cover located in front side of the counterweight to accommodate therein mounted equipments such as an engine, a heat exchanger, and a hydraulic pump. In addition, the housing cover is equipped with an engine cover on the top surface side, which is opened or closed upon performing a maintenance operation of the mounted equipments such as the engine.

Now, upon performing a ground excavating operation or the like with a hydraulic excavator, maintenance operations such as inspections and maintenances are performed in regard to various mounted equipments such as an engine, a heat exchanger, a hydraulic pump and a hydraulic cylinder provided in a working mechanism. Therefore, the hydraulic excavator is usually provided with a tool box for accommodating various tools necessary for a maintenance operation to the mounted equipments (Patent Literature 1: Japanese Patent Laid-Open No. Hei 9-195316A, Patent Literature 2: Japanese Patent Laid-Open No. Hei 11-193548 A).

The hydraulic excavator in the above-mentioned Patent Literature 1 is configured to be provided with a tool locating portion by the use of a space in a hollow side deck provided in the left side of an upper revolving structure and accommodate the tool box in this tool locating portion. Meanwhile, the hydraulic excavator in Patent Literature 2 is configured to use a space formed under a seat stand supporting a driver's seat for providing a tool box on an under side surface of a cover covering a front surface side of this seat stand.

However, the hydraulic excavator in the above-mentioned Patent Literature 1 is configured to accommodate the tool box in the narrow space formed in the side deck, and the hydraulic excavator in Patent Literature 2 is configured to accommodate the tool box in the narrow space formed under the driver's seat. Therefore, in any of the above cases, labors and time are required for taking in and out the tool box at maintenance operating, raising a problem with deterioration of operability at the time of performing inspections and maintenances to the mounted equipments by using a tool.

On the other hand, there is proposed a hydraulic excavator for accommodating a tool box in a housing cover accommodating a mounted equipment such as an engine by mounting the tool box in a counterweight located in a rear end side of an upper revolving structure. In the hydraulic excavator, by opening and closing an engine cover (engine hood) covering an engine, an operation of taking out or in the tool box can be easily performed in a wide space (Patent Literature 3: Japanese Utility Model Laid-Open No. Hei 6-34062 A).

DISCLOSURE OF THE INVENTION

However, above described Patent Literature 3 is based upon a large-sized hydraulic excavator where a space as much as the tool box can be accommodated is formed between the counterweight and the engine. On the other hand, in a small-sized construction machine called a hydraulic excavator of a type having a small swing radius at the rear, the counterweight and the engine are arranged close to each other, thus forming only a slight gap therebetween. Therefore, the small-sized construction machine has a problem that it is difficult to secure a space as much as to accommodate the tool box in the housing cover.

In view of the above-discussed problems with the prior art, it is an object of the present invention to provide a construction machine which is configured to be capable of securing a space for accommodating an article such as a tool in a housing cover.

(1) To overcome the above-discussed problems, the present invention is applied to a construction machine comprising an automotive vehicle body provided with a working mechanism at a front side thereof, a counterweight provided at a rear side of the vehicle body for keeping a weight balance with the working mechanism, an engine mounted on the vehicle body to be positioned in front side of the counterweight, a heat exchanger mounted on the vehicle body adjacent to the engine to cool a fluid by a cooling air, and a housing cover for accommodating mounted equipments such as the engine and the heat exchanger therein and including an engine cover at a top surface side which is opened or closed at the time of performing a maintenance operation of the mounted equipments.

The present invention is characterized in that the heat exchanger is provided with a partition member partitioning between the engine and the heat exchanger and extending upwards over a top surface of the heat exchanger, and a space surrounded by the partition member, atop surface side of the heat exchanger and an under surface side of the engine cover is defined as an article accommodating space.

With this arrangement of the present invention, for example, even in the construction machine of a type in which the engine and the counterweight are arranged close to each other, the article accommodating space having a wide space in the housing cover can be secured, and it is possible to accommodate an article such as a tool in this article accommodating space. Therefore, by opening the engine cover, it is possible to easily take in and out the article accommodated in the article accommodating space inside a wide space, for example, it is possible to quickly take in and out an article such as a tool used for maintenance operations such as repairs or inspections to the mounted equipments such as the engine. Therefore, efficiency of the maintenance operation can be enhanced.

On the other hand, by locking the engine cover to be held in a closed position, the article accommodating space can be covered with the engine cover. Therefore, for example, theft of an article accommodated in the article accommodating space can be prevented. Further, since it is possible to suppress transmission of a thermal gas from the engine to the article accommodating space with the partition member, for example, even in a case of accommodating a component or tool made of plastic in the article accommodating space, it is possible to suppress the component made of plastic or the like to be degraded due to heat. As a result, the article accommodated in the article accommodating space is not excessively heated, and, for example, even immediately after the engine is stopped, it is possible to easily take in or out the article accommodated in the article accommodating space.

(2) According to the present invention, a suction type cooling fan, which is driven by the engine, is provided between the heat exchanger and the engine, and the article accommodating space is formed an upstream side of the partition member in a flow direction of the cooling air. By virtue of this configuration, the article accommodating space can be exposed to the flow of the cooling air to certainly suppress the component or tool made of plastic to be degraded due to heat.

(3) In this case, according to the present invention, the article accommodating space accommodates an article box therein. By thus accommodating the article box in the article accommodating space, for example, a plurality of articles such as various tools can be all together accommodated in the article box, and therefore, the articles can be taken in and out from the article accommodating space in a unit of the article box.

(4) On the other hand, according to the present invention, a box supporting tool is provided in a portion at the top surface side of the heat exchanger defining the article accommodating space, and the box supporting tool supports the article box. In consequence, also at the time of traveling or operating of the construction machine, the article box from irregularly moving in the article accommodating space due to vibration of a machine and colliding with the partition member or the like, thus protecting the article box from collision with the heat exchanger, the partition member and the like.

(5) In this case, according to the present invention, the box supporting tool comprises a bottom surface supporting the article box from the lower side and a side wall surface rising up from the bottom surface to surround the article box from the outside, and a height dimension from the bottom surface to an upper end portion of the side wall surface of the box supporting tool is set to be larger than a gap dimension formed between a top surface of the article box and an under surface of the engine cover in a state of supporting the article box by the box supporting tool.

By virtue of this configuration, the box supporting tool can securely support the article box. Namely, even if the article box moves in upward and downward directions to the box supporting tool due to vibration generated when the construction machine travels on an irregular ground and the top surface of the article box collides with the under surface of the engine cover, the article box can be held to be surrounded by the side wall surface of the box supporting tool. Therefore, it can be suppressed for the article box to move out of the box supporting tool.

Accordingly, since it is not necessary to fix the article box to the box supporting tool by the use of a fastening member or the like and the article box can be easily taken out simply by opening the engine cover, it is possible to enhance operability at the time of performing a maintenance operation of the engine or the like by using tools or the like accommodated in the article box.

(6) According to the present invention, the heat exchanger comprises a support frame formed as a frame structure having a front surface, a rear surface, a side surface, and a top surface, and a heat exchange element provided in the support frame, and the partition member is provided on the side surface of the support frame adjacent to the engine to protrude upwards over the top surface.

With this configuration, the partition member protruding upwards over the top surface of the support frame of the heat exchanger can block heat from the engine to suppress the article box arranged in the upper surface side of the heat exchanger to be heated.

(7) Further, according to the present invention, a shielding member is provided in an under surface side of the engine cover at a position opposing the partition member to extend in forward and rearward directions, and the shielding member and the partition member cooperate with each other to shield between the engine and the heat exchanger.

With this configuration, after the cooling air supplied in the housing cover by the cooling fan of the engine passes through the heat exchanger and becomes high in temperature, the shielding member can prevent the high-temperature cooling air from flowing around into the upstream side of the heat exchanger.

BRIEF DESCRIPTION OF THE DRAWINGS

FIG. 3 is a plan view illustrating an upper revolving structure in FIG. 2 by omitting a cab, a housing cover and the like.

FIG. 10 is an exploded perspective view illustrating the heat exchanger, the partition member, the box supporting tool and the like.

FIG. 11 is a perspective view illustrating the heat exchanger, the partition member, the box supporting tool, the article box and the like.

DESCRIPTION OF THE REFERENCE NUMERALS

Figure 1:
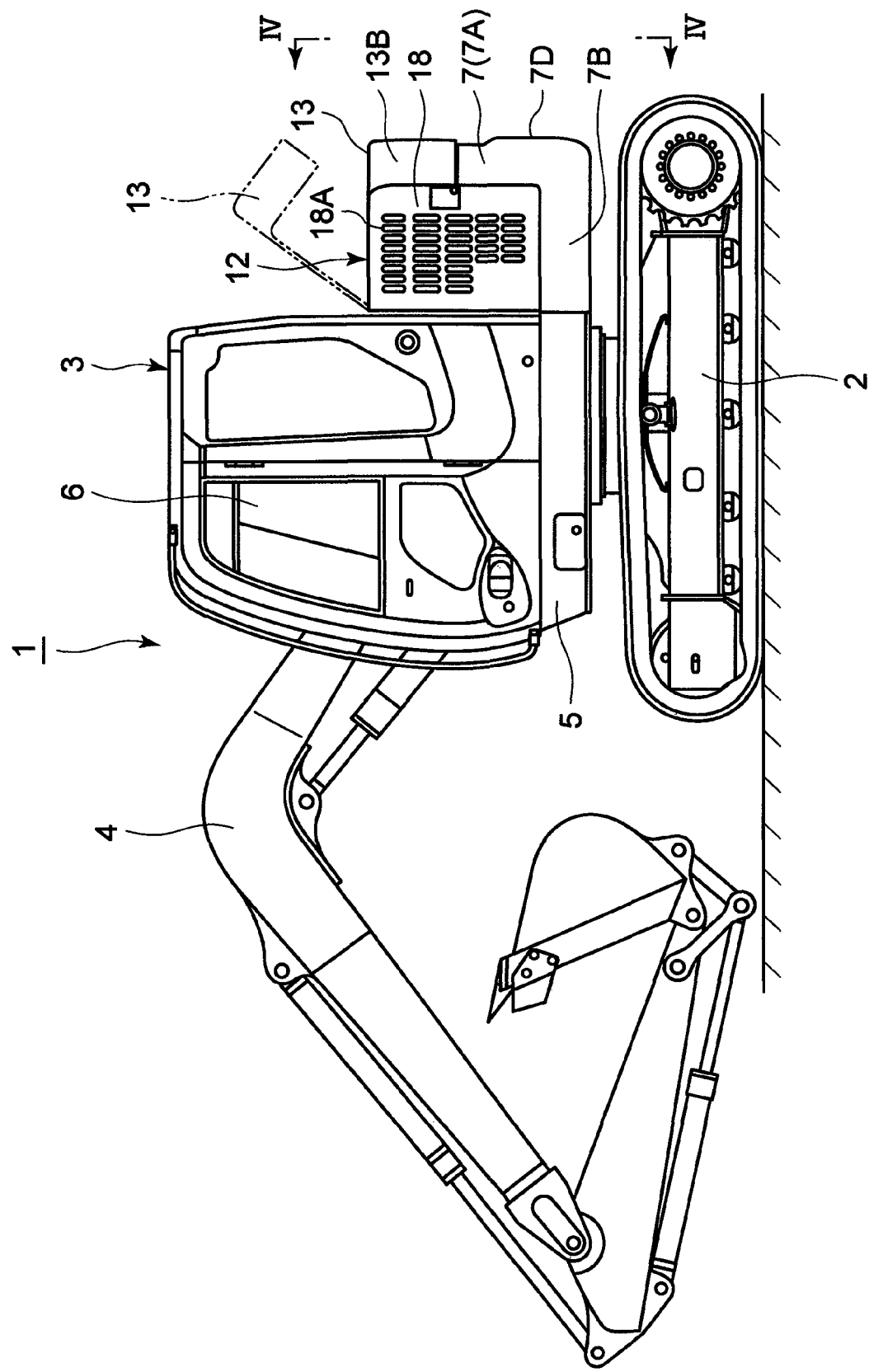
FIG. 1 is a side view illustrating a hydraulic excavator in accordance with an embodiment of the present invention.

1: Hydraulic excavator (construction machine)
2: Lower traveling structure (vehicle body)
3: Upper revolving structure (vehicle body)
4: Working mechanism
5: Revolving frame
7: Counterweight
8: Engine
8B: Cooling fan
12: Housing cover 13: Engine cover
13C: Shielding member
20: Heat exchanger
21: Support frame
21A: Front plate (front surface)
21B: Rear plate (Rear surface)
21C: Right side plate (side surface)
21D: Top plate (top surface)
22: Radiator (heat exchange element)
23: Oil cooler (heat exchange element)
24: Intercooler (heat exchange element)
26: Partition member
30: Article accommodating space
31: Box supporting tool
31A: Bottom surface
31B: Side wall surface
32: Article box
32A: Top surface

BEST MODE FOR CARRYING OUT THE INVENTION

Hereinafter, with reference to accompanying drawings, a detailed description will be given by citing as an example a hydraulic excavator as in accordance with an embodiment of the present invention. It should be noted that in the embodiment, a case where an engine is located in a transverse state and a heat exchanger is located in the left side to the engine in right and left directions will be taken as an example for explanation.

In the figure, designated at 1 is a small-sized hydraulic excavator as a representative example of a construction machine. A vehicle body of the hydraulic excavator 1 is largely constituted by a crawler type automotive lower traveling structure 2 and an upper revolving structure 3 rotatably mounted on the lower traveling structure 2. A working mechanism 4 is liftably provided on a front side of the upper revolving structure 3, carrying out a ground excavating operation of earth and sand by the working mechanism 4.

Figure 2:
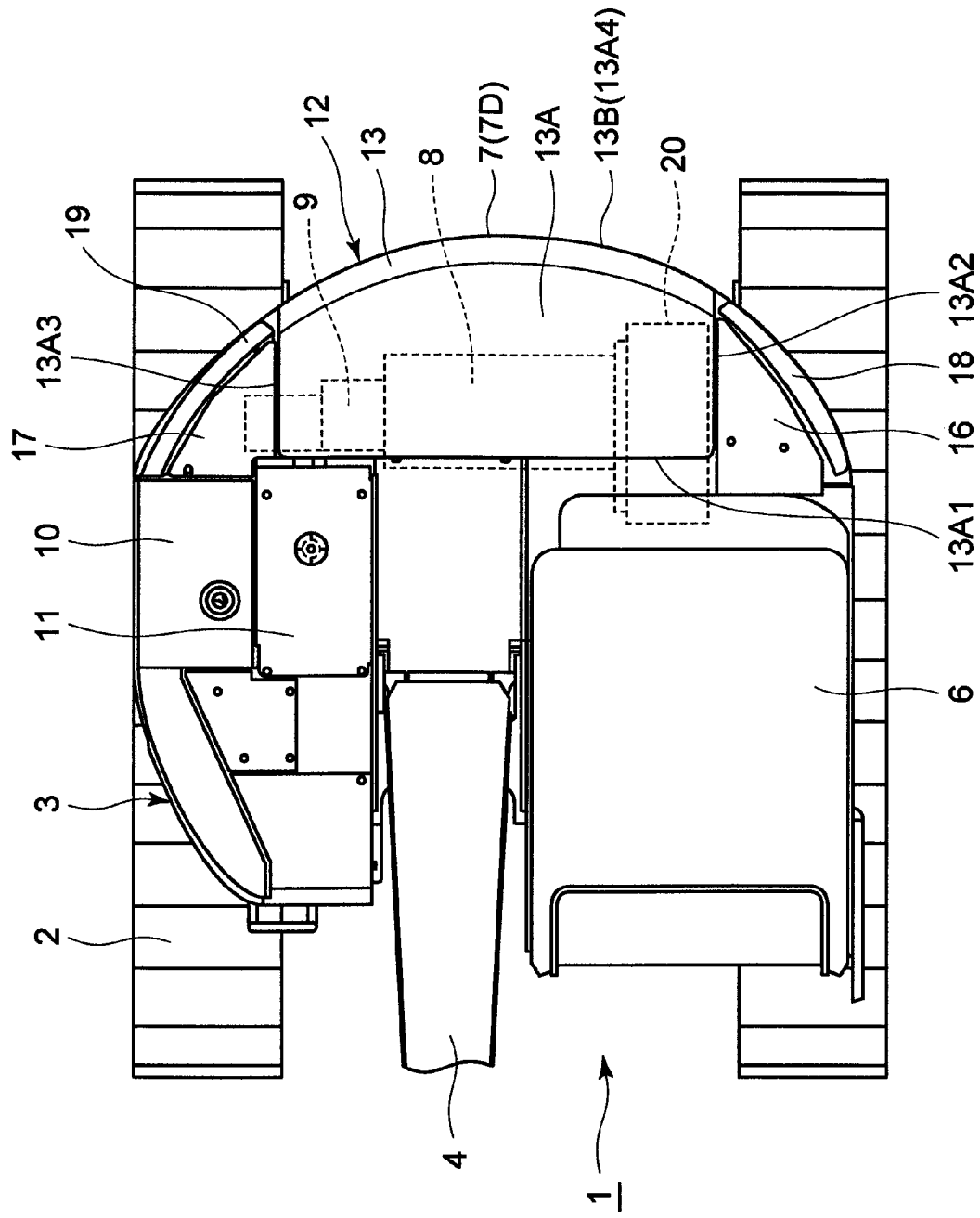
FIG. 2 is a plan view illustrating the hydraulic excavator as viewed from above.

As shown in FIG. 2, the upper revolving structure 3 has a width dimension substantially equal to a vehicle width of the lower traveling structure 2 in the right and left directions and is formed in a substantially circular shape as viewed from above. As a result, the hydraulic excavator 1 is constituted as a hydraulic excavator of a type having a small swing radius at the rear in which when the upper revolving structure 3 revolves on the lower traveling structure 2, a rear surface 7D of a counterweight 7 to be described later can be accommodated substantially within the vehicle width of the lower traveling structure 2.

Figure 3:
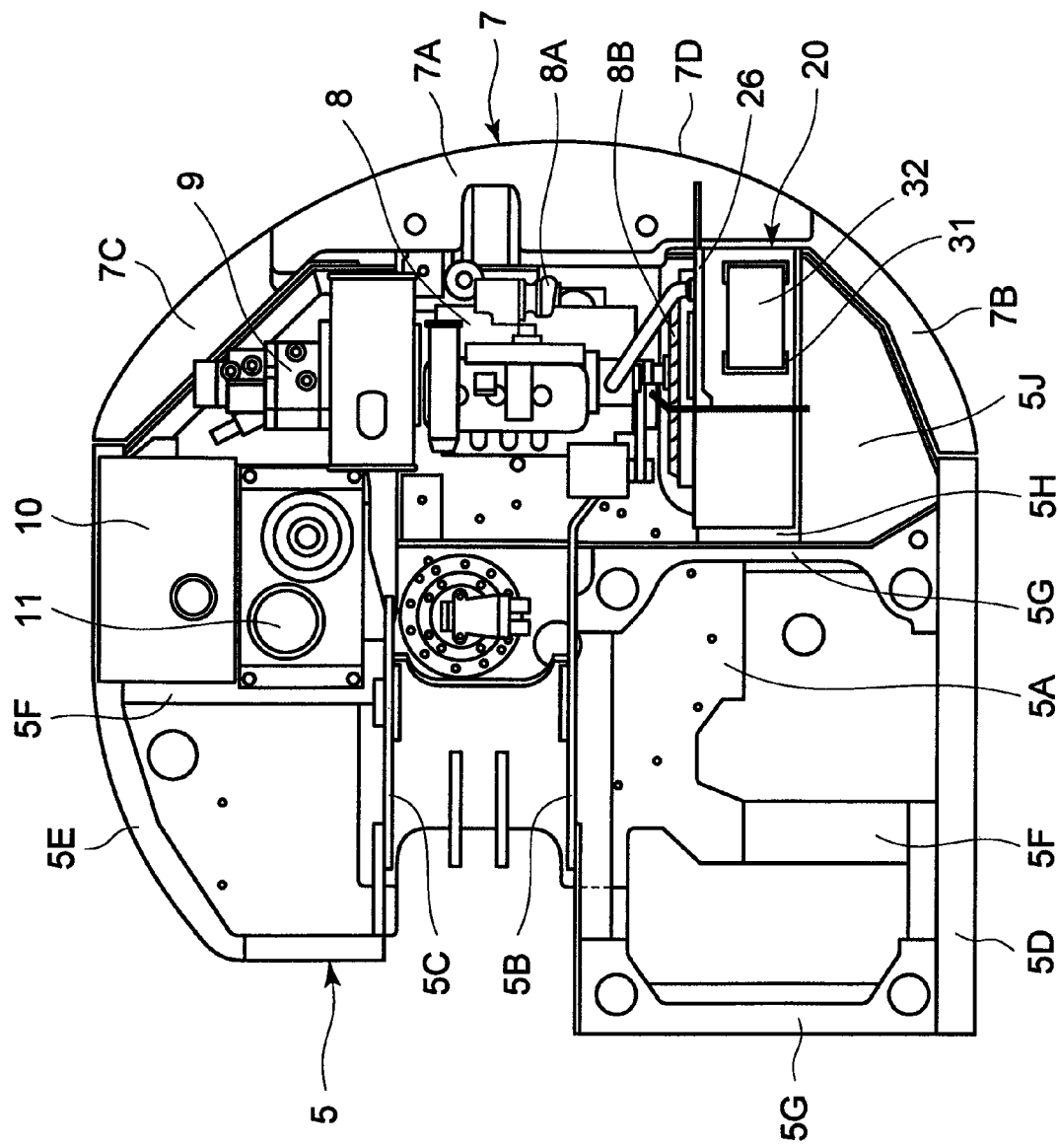
Figure 4:
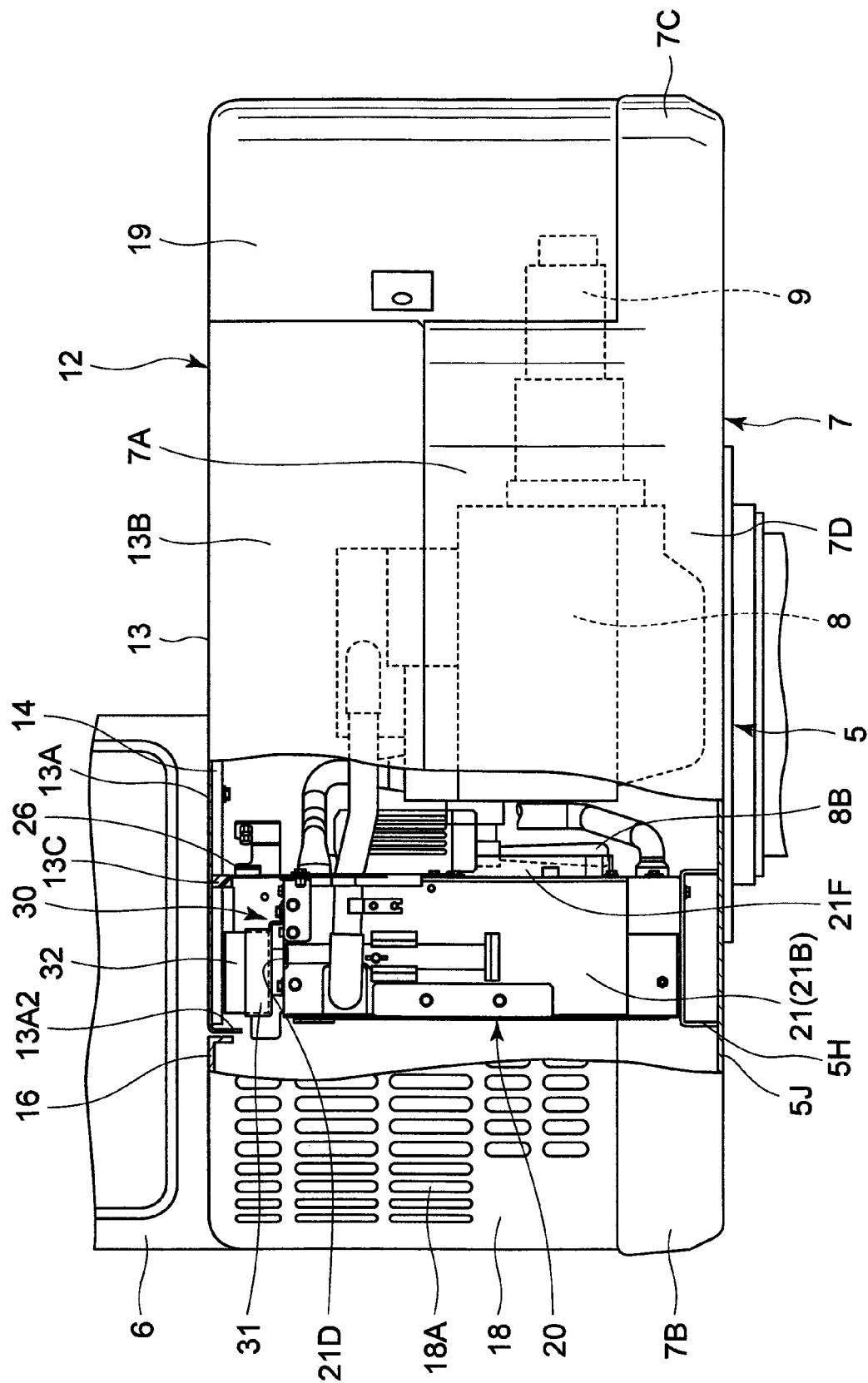
FIG. 4 is a partial cutaway rear view illustrating a counterweight, an engine, a heat exchanger, an engine cover and the like, taken in the direction of the arrows IV-IV of FIG. 1.
Figure 5:
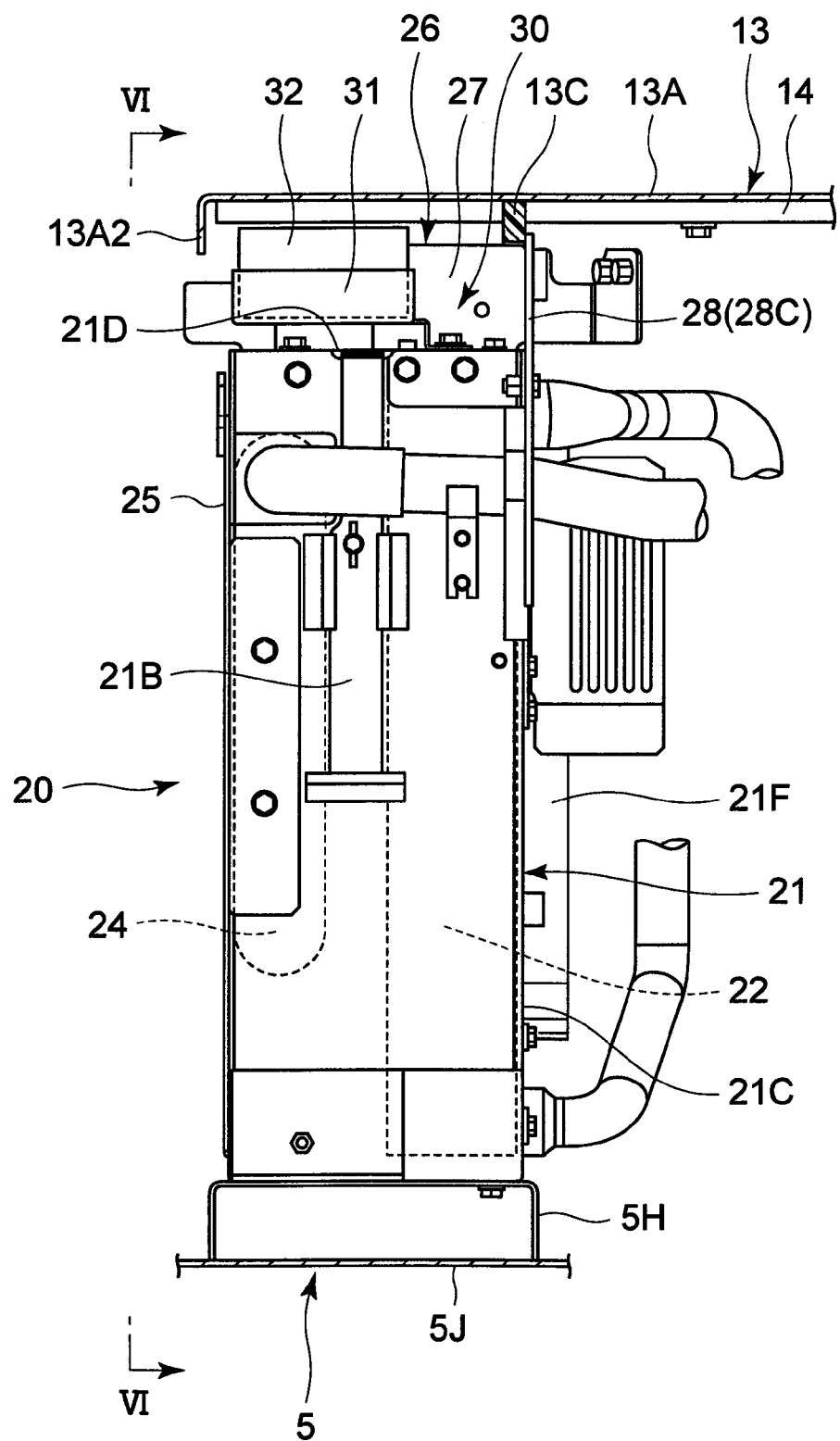
FIG. 5 is an enlarged rear view illustrating the heat exchanger, the engine cover, a partition member, an article accommodating space, an article box and the like in FIG. 4.

Denoted at 5 is a revolving frame as a base of the upper revolving structure 3. As shown in FIG. 3, the revolving frame 5 is largely constituted by a bottom plate 5A formed of a thick steel plate and extending in the forward and rearward directions or the like, right and left vertical plates 5B and 5C rising up on the bottom plate 5A, opposing with each other by a given interval in the right and left directions and extending in the forward and rearward directions, a left side frame 5D located in the left side of the left vertical plate 5B and extending in the forward and rearward directions, a right side frame 5E located in the right side of the right vertical plate 5C and extending in the forward and rearward directions, and a plurality of extension beams 5F connecting between the bottom plate 5A, and the right and left side frames 5D and 5E to form a strong support structure.

A proximal end side of the working mechanism 4 is rotatably supported on front sides of the right and left vertical plates 5B and 5C, and a counterweight 7 and an engine 8, which will be described hereinafter, are mounted at rear sides of the right and left vertical plates 5B and 5C. Cab support frames 5G are provided to be spaced apart in the forward and rearward directions from each other between the left vertical plate 5B and the left side frame 5D for supporting a cab 6 to be described hereinafter. Further, a heat exchanger support base 5H supporting the heat exchanger 20 to be described later is provided between the rear side of the cab support frame 5G and the counterweight 7. It should be noted that an undercover 5J made of steel sheet material is provided under the heat exchanger 20 to protect the heat exchanger 20.

Indicated at 6 is a cab located on the left side in the front side of the revolving frame 5 and the cab 6 is supported on the cab support frame 5G of the revolving frame 5 to define an operation room. An operation seat for an operator, a control lever for traveling, a control lever for working and the like (none are shown) are located inside the cab 6.

Denoted at 7 is the counterweight mounted on a rear end portion of the revolving frame 5, and the counterweight 7 is provided for keeping a weight balance with the working mechanism 4. Here, the counterweight 7 is constituted by a weight body portion 7A having a large height dimension and located at the center portion in the right and left directions to be positioned in back of the engine 8, a left front weight portion 7B having a small height dimension and extending forward from the left lower side of the weight body portion 7A toward the left side frame 5D of the revolving frame 5, and a right front weight portion 7C having a small height dimension and extending forward from the right lower side of the weight body portion 7A toward the right side frame 5E of the revolving frame 5. As a result, the counterweight 7 is formed in an arc shape as a whole, a central portion of which protrudes upwards to form a convex shape.

In this case, a rear surface 7D of the counterweight 7 is configured to be accommodated substantially in a vehicle width of the lower traveling structure 2 when the upper revolving structure 3 revolves on the lower traveling structure 2. Therefore, the counterweight 7 is located at a position close to the engine 8 to be described hereinafter and is configured to be opposed to the engine 8, the heat exchanger 20 to be described later and the like with a slight gap therebetween.

Denoted at 8 is the engine mounted in front side of the counterweight 7. The engine 8 is located in a transverse state extending in the rightward and leftward directions and is provided with a turbocharger 8A increasing a flow amount of intake air, for example. A suction type cooling fan 8B is provided in the left side of the engine 8, and the cooling air 8B is driven for rotation at the operating of the engine 8, thus supplying a cooling air into a housing cover 12 to be described later. Further, the heat exchanger 20 to be described later is arranged adjacent to the cooling fan 8B in the left side thereof.

On the other hand, a hydraulic pump 9 driven by the engine 8 is mounted in the right side of the engine 8 and the hydraulic pump 9 delivers pressurized oil for operation to various hydraulic actuators provided in the hydraulic excavator 1. The engine 8, the hydraulic pump 9, the heat exchanger 20 and the like constitute the mounted equipments which are accommodated in the revolving frame 5 and are accommodated by the housing cover 12, which will be described hereinafter.

Indicated at 10 is a fuel tank which is located to be positioned in the right side of the revolving frame 5 and in front side of the hydraulic pump 9, and the fuel tank 10 serves to reserve fuel to be supplied to the engine 8. Indicated at 11 is an operating oil tank located adjacent to the fuel tank 10 in the left side thereof, and the operating oil tank 11 serves to reserve operating oil to be supplied to the hydraulic actuator provided in the hydraulic excavator 1.

Next, the housing cover 12 positioned in front side of the counterweight 7 and located on the revolving frame 5 will be described.

Denoted at 12 is the housing cover. The housing cover 12 accommodates therein mounted equipments such as the engine 8, hydraulic pump 9, and the heat exchanger 20 to be described hereinafter. Here, the housing cover 12 is constituted by an engine cover 13, a left upper surface cover 16, a right upper surface cover 17, a left side door 18, and a right side door 19, which will be described hereinafter.

Indicated at 13 is the engine cover constituting an upper surface side of the housing cover 12, and the engine cover 13 covers mounted equipments such as the engine 8, the hydraulic pump 9 and the heat exchanger 20 from upward and rearward to be openable or closable. The engine cover 13 is largely constituted by a top plate 13A extending in the right and left directions and a rear plate 13B bent downwards from the rear end side of the top plate 13A and bent in an arc shape along the rear surface 7D of the counterweight 7 in a state of covering the upward side of the mounted equipments.

As shown in FIG. 2, a front end portion 13A1 of the top plate 13A of the engine cover 13 linearly extends in the right and left directions. A left end portion 13A2 and a right end portion 13A3 of the top plate 13A linearly extend respectively in the forward and rearward directions, and a rear end portion 13A4 of the top plate 13A extends in an arc shape as a boundary portion to a rear plate 13B.

Figure 6:
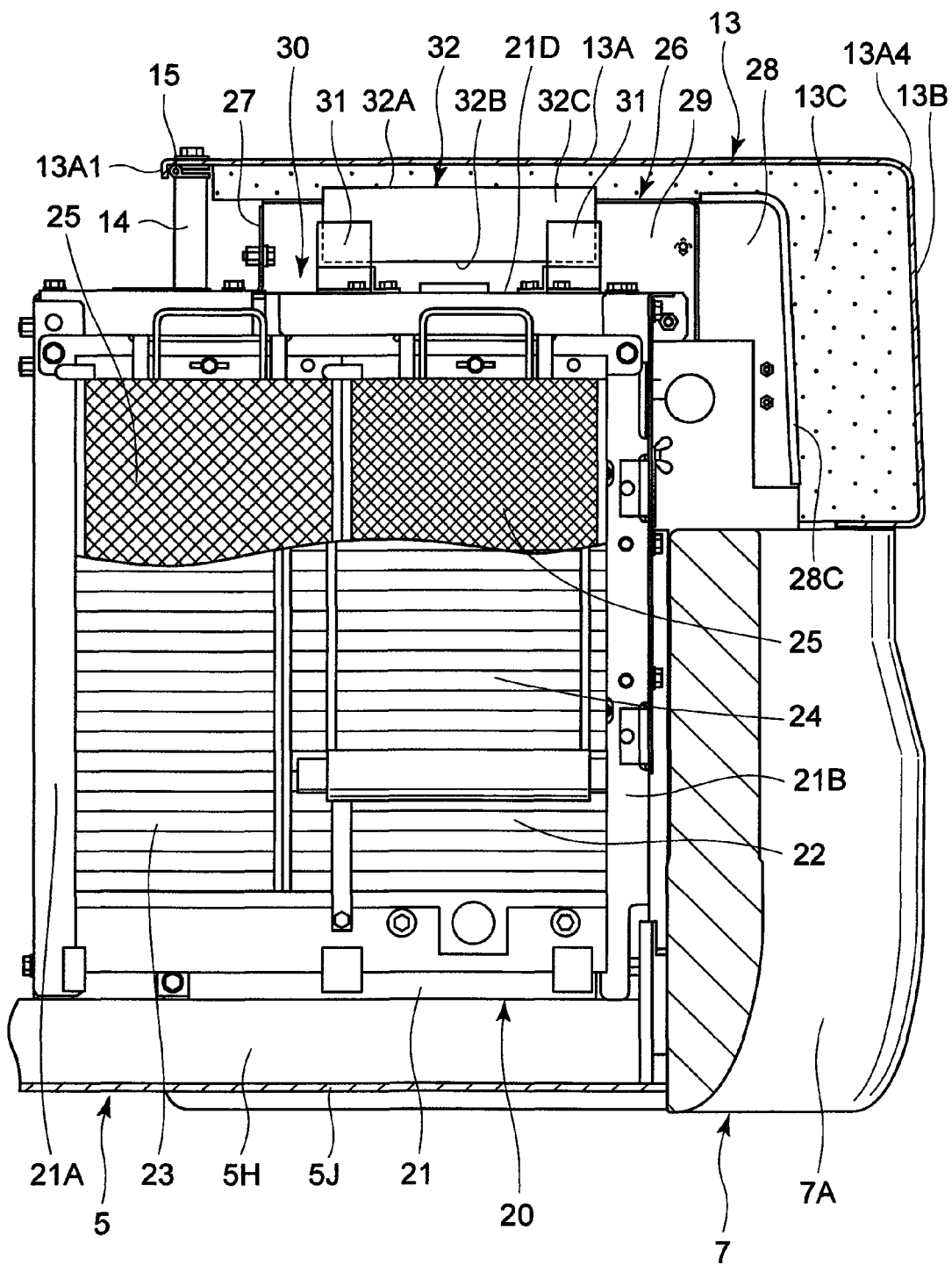
FIG. 6 is an enlarged side view illustrating the heat exchanger, the partition member, the article box and the like, taken in the direction of the arrows VI-VI of FIG. 5.

As shown in FIG. 6 or the like, the front end portion 13A1 of the top plate 13A is mounted in a support member 14 located on the revolving frame 5 to be rotatable in the upward and downward directions on the basis of a plurality of hinges 15. Therefore, upon performing an inspection operation on the engine 8 and hydraulic pump 9, the engine cover 13 is configured to open/close in the upward and downward directions between a closing position shown in a solid line and an open position shown in a chain double-dashed line in FIG. 1. Further, the engine cover 13 is configured to be provided with a locking mechanism (not shown), wherein the engine cover 13 can be locked in a closed position by locking the locking mechanism.

As shown in FIG. 6, a shielding member 13C formed, for example, of sponge rubber adheres to an under side surface of the engine cover 13. The shielding member 13C is arranged above the right side (right side plate 21C of a support frame 21) of the heat exchanger 20 to be described later and extends in the forward and rearward directions between the front end portion 13A1 and the rear end portion 13A4 of the top plate 13A. Thereby, at the time of putting the engine cover 13 in a closed position, the shielding member 13C can abut against an outer peripheral edge portion of a partition member 26 to be described later with appropriate resiliency. On the other hand, the cooling air suctioned into the housing cover 12 by the cooling fan 8B of the engine 8 passes through the heat exchanger 20, thereby to become high in temperature. Therefore, the shielding member 13C prevents the cooling air in high temperature from again flowing around into the upstream side (outside air suction side) of the heat exchanger 20.

Indicated at 16 is a left upper surface cover located in the left side of the engine cover 13. The left upper surface cover 16 is formed substantially in a flat shape of a triangle. The left upper surface cover 16 is fixed adjacent to the left end side 13A2 of the top plate 13A constituting the engine cover 13 to cover the heat exchanger 20 or the like together with the engine cover 13 from above.

Indicated at 17 is a right upper surface cover located in the right side of the engine cover 13. The right upper surface cover 17 is formed substantially in a flat shape of a triangle. The right upper surface cover 17 is fixed adjacent to the right end side 13A3 of the top plate 13A constituting the engine cover 13 to cover the hydraulic pump 9 or the like together with the engine cover 13 from above.

Indicated at 18 is a left side door located between the counterweight 7 and the cab 6 to be positioned under the left upper surface cover 16. The left side door 18 serves to cover the heat exchanger 20 or the like from the left side so as to be openable and closable. The left side door 18 is provided with many inlet ports 18A to flow the cooling air in the housing cover 12 toward the heat exchanger 20 to be described hereinafter.

Indicated at 19 is a right side door located between the counterweight 7 and the fuel tank 10 to be positioned under the right upper surface cover 17. The right side door 19 serves to cover the hydraulic pump 9 or the like from the right side so as to be openable and closable.

Next, the heat exchanger 20 which is adjacent to the left side of the engine 8 and provided on the revolving frame 5 will be explained.

That is, denoted at 20 is the heat exchanger, and the heat exchanger 20 is positioned between the cab 6 and the counterweight 7 and is fixed on a heat exchanger supporting base 5H of the revolving frame 5. The heat exchanger 20 cools various fluids (engine cooling water, operating oil, compressed intake air and the like) a temperature of which has increased, by the cooling air supplied in the housing cover 12 by the cooling fan 8B of the engine 8. Here, as shown in FIG. 5 to FIG. 11, the heat exchanger 20 is largely constituted by the support frame 21 and heat exchange elements formed of a radiator 22, an oil cooler 23 and an intercooler 24, which will be described hereinafter.

Indicated at 21 is the support frame formed of a frame structure for constituting an outer shell of the heat exchanger 20, and the support frame 21 is formed of a rectangular form which is elongated in the forward and rearward directions. The support frame 21 is fixed on the heat exchanger supporting base 5H of the revolving frame 5 in a state of surrounding and supporting the heat exchange elements formed of the radiator 22, the oil cooler 23 and the intercooler 24, which will be described hereinafter.

Figure 9:
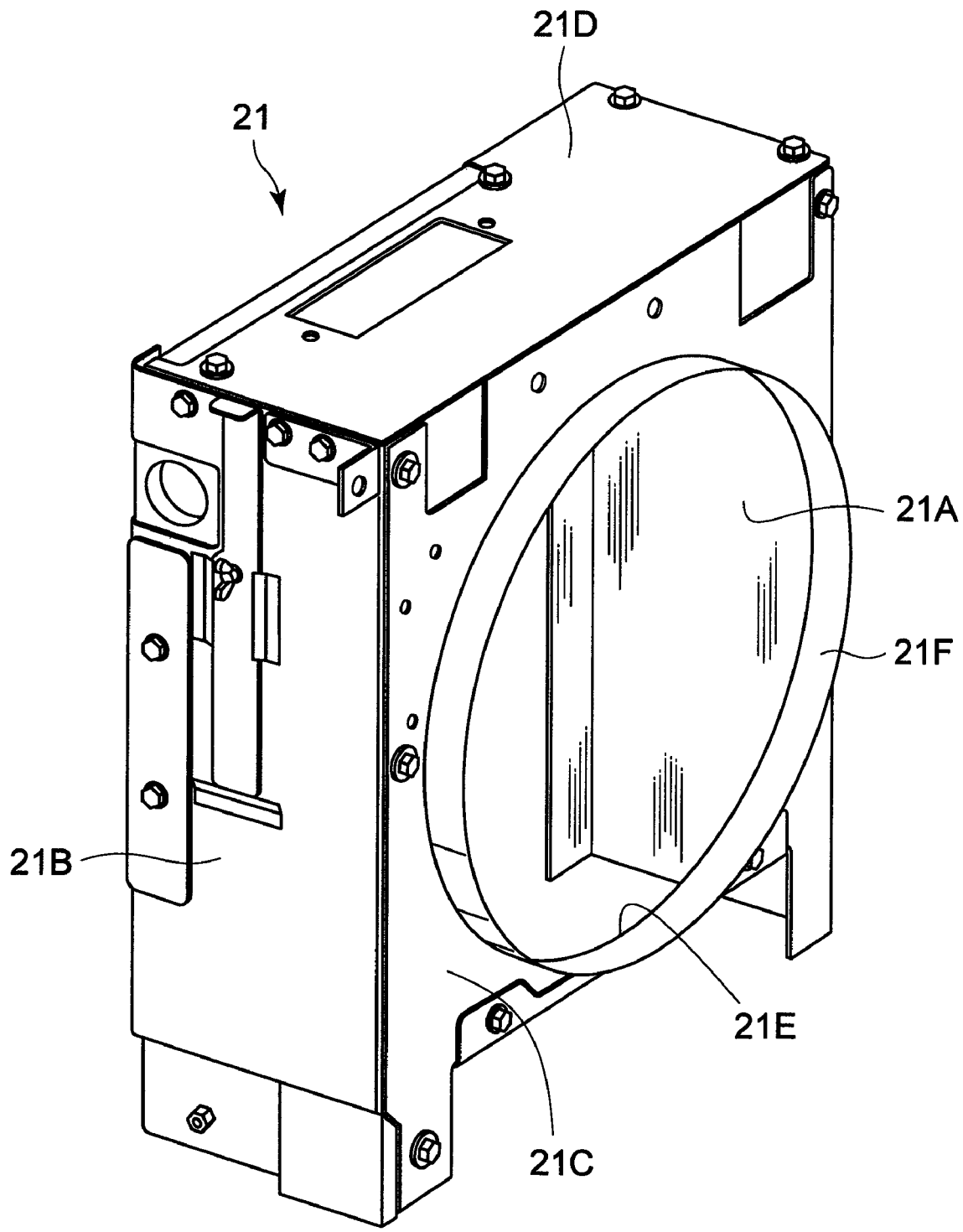
FIG. 9 is a perspective view illustrating a support frame of the heat exchanger as a single unit.

Here, as shown in FIG. 9, the support frame 21 is largely constituted by a front plate 21A located in the side of the cab 6, a rear plate 21B located in the side of the counterweight 7 to oppose the front plate 21A in the forward and backward directions, a right side plate 21C which makes a connection between the front plate 21A and the rear plate 21B and is located facing the engine 8 to be adjacent to the engine 8, a top plate 21D provided in the upper end sides of the front plate 21A, the rear plate 21B and the right side plate 21C, and extending in the forward and backward directions. An air flow hole 21E having a large diameter and a cylindrical fan shroud 21F protruding from an outer peripheral side of the air flow hole 21E to the side of the engine 8 are provided in the central portion of the right side plate 21C, and the cooling fan 8B of the engine 8 is configured to be surrounded from the outer peripheral side by the fan shroud 21F.

Denoted at 22 is the radiator mounted on the support frame 21 to be opposed to the cooling fan 8B of the engine 8, and the radiator 22 is arranged to be opposed to the flow direction (right and left directions) of the cooling air suctioned into the housing cover 12 by the cooling fan 8B. The radiator 22 serves to release heat of the engine cooling water by the cooling air suctioned by the cooling fan 8B and to cool down the engine 8.

Indicated at 23 is the oil cooler mounted on the support frame 21 to be in front of the radiator 22 in parallel therewith, and the oil cooler 23 is arranged against the flow direction of the cooling air suctioned into the housing cover 12 in a state of being adjacent to the radiator 22 in the forward and rearward directions. The oil cooler 23 serves to release heat of operating oil returning back from the various actuators provided in the hydraulic excavator 1 to the operating tank 11 into cooling air, thus cooling the operating oil.

Indicated at 24 is the intercooler mounted in the support frame 21 in a state of overlapping with the radiator 22 in the right and left directions. That is, the intercooler 24 is arranged upstream of the radiator 22 in the flow direction of the cooling air suctioned into the housing cover 12. The intercooler 24 serves to release heat of compressed intake air supplied from the turbocharger 8A of the engine 8 into cooling air for cooling this compressed intake air.

Indicated at 25 are two sheets of dust protective screens detachably mounted in the left side of the support frame 21 in the right and left directions. Namely, each dust protective screen 25 is arranged upstream of the radiator 22, the oil cooler 23, and the intercooler 24 in the flow direction of the cooling air. Each dust protective screen 25 serves to trap dusts contained in the cooling air and supply the clean cooling air to the heat exchanger 20.

Next, a partition member 26 partitioning between the engine 8 and the heat exchanger 20 will be explained.

Figure 12:
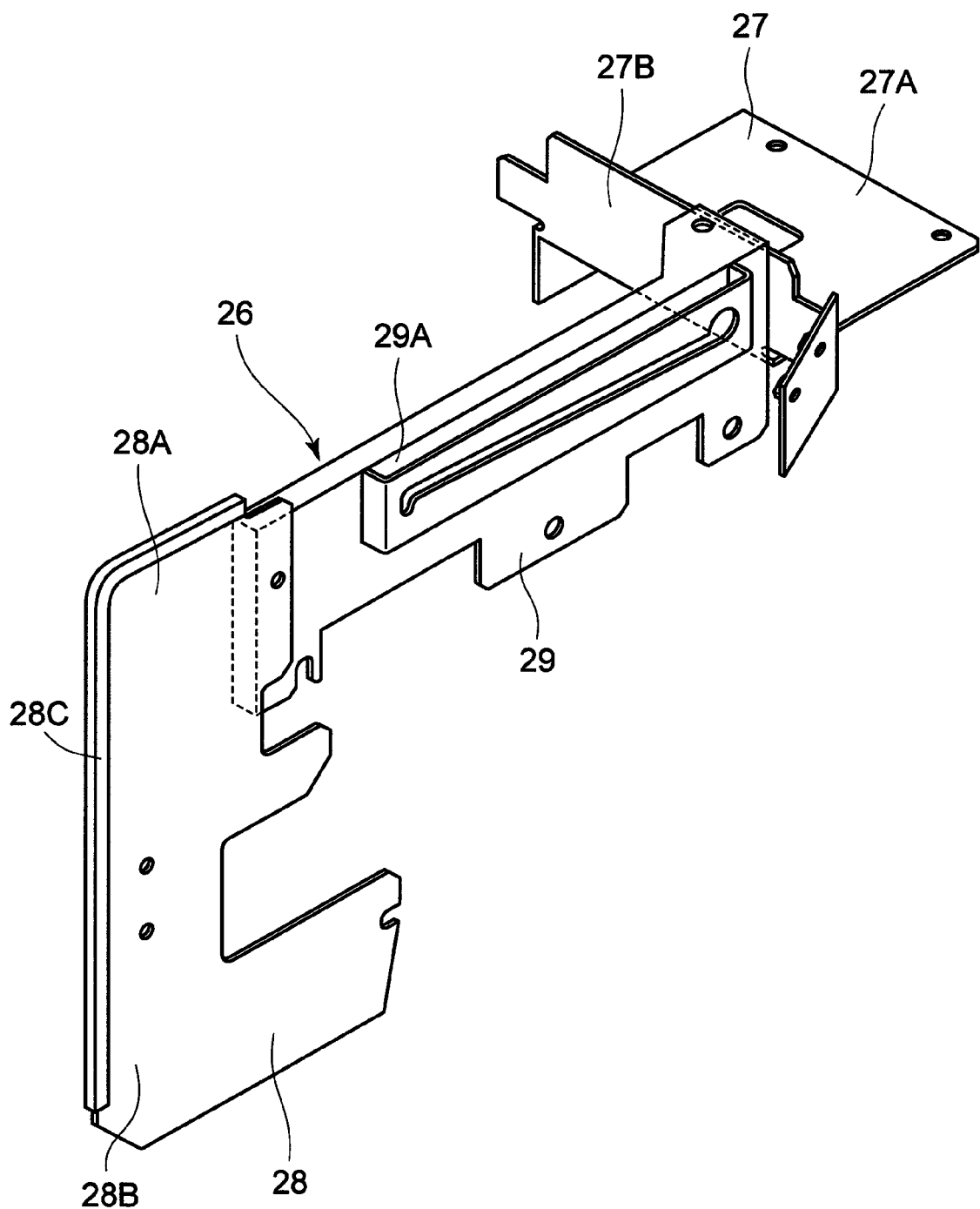
FIG. 12 is a perspective view illustrating a front partition plate, a rear partition plate and an intermediate partition plate constituting the partition member in an enlarged form.
Figure 13:
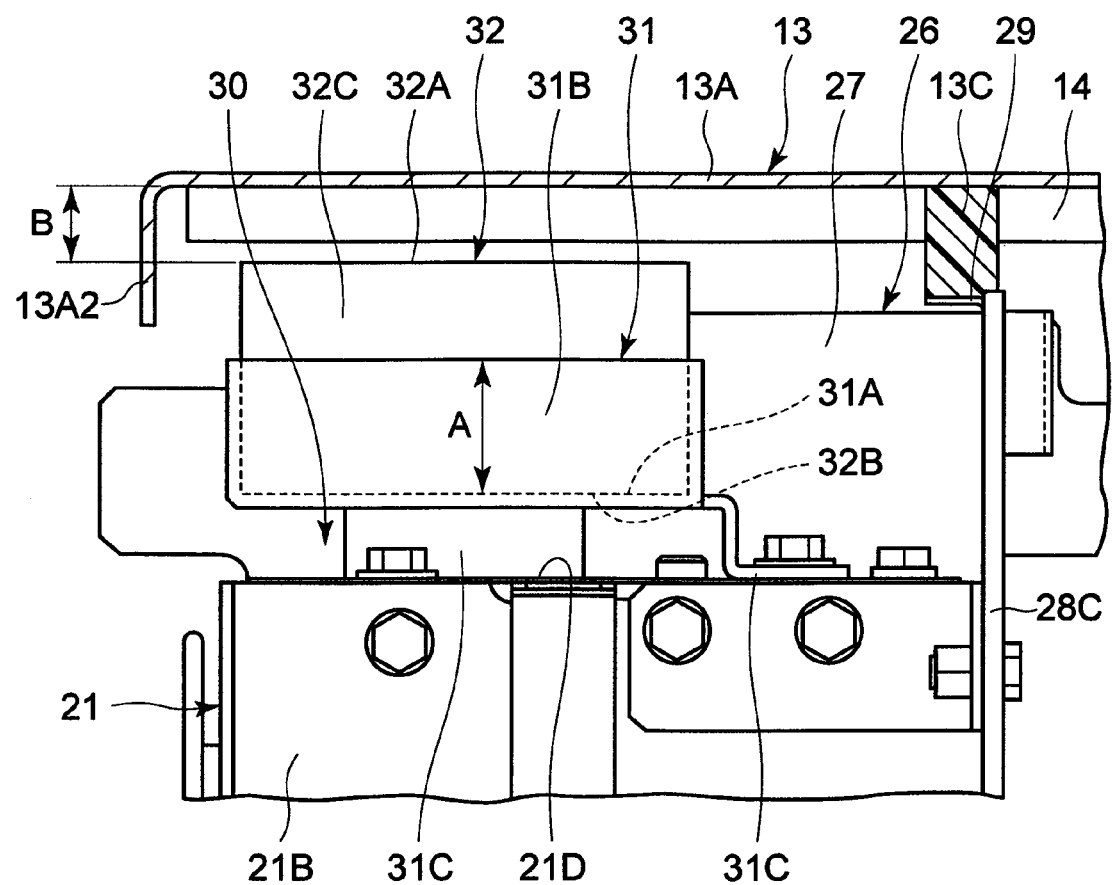
FIG. 13 is a partially enlarged view illustrating the engine cover, the box supporting tool and the article box in FIG. 5.

Namely, denoted at 26 is the partition member provided in the heat exchanger 20. The partition member 26 is mounted on the right side plate 21C of the support frame 21 which is adjacent to the engine 8, and an upper portion thereof extends upwards over the top plate 21D of the support frame 21. The partition member 26 cooperates with the shielding member 13C to partition between the engine 8 and the heat exchanger 20, thus preventing heat generated in the engine 8 from being transmitted to the cooling air suctioned into the heat exchanger 20. As shown in FIG. 12 and FIG. 13, the partition member 26 is comprised of a front partition member 27, a rear partition member 28, and an intermediate partition member 29, which will be described hereinafter.

Indicated at 27 is the front partition member provided in an upper end side in a front side of the support frame 21 constituting the heat exchanger 20. The front partition member 27 includes a substantially square flat portion 27A and a front rising portion 27B rising upwards from a rear end portion of the flat portion 27A and extending in the right and left directions. The front partition plate 27 is arranged above the oil cooler 23 and is configured such that the front rising portion 27B protrudes upwards (the side of the engine cover 13) from the top plate 21D of the support frame 21 by bolting the flat portion 27A to the front plate 21A of the support frame 21.

Indicated at 28 is the rear partition plate provided in an upper end side in a rear side of the support frame 21. The rear partition plate 28 is formed in a flat shape extending in the upward and downward directions as a whole, and a front end side thereof is bolted to the right side plate 21C of the support frame 21. The rear partition plate 28 is constituted such that an upper position 28A thereof protrudes upwards from the top plate 21D of the support frame 21 and a rear position 28B thereof protrudes backwards (the side of the counterweight 7) from the rear plate 21B of the support frame 21. As shown in FIG. 6, FIG. 13 and the like, for example, a mall 28C formed of resilient material such as rubber having heat resistance is mounted on an outer peripheral edge portion of the rear partition plate 28. Since this mall 28C is formed of soft material, even if the mall 28C gets in contact with the shielding member 13C provided in the under side surface of the engine cover 13, it is possible to prevent the shielding member 13C from being damaged.

Indicated at 29 is the intermediate partition plate provided in an upper end side in an intermediate portion of the support frame 21. The intermediate partition plate 29 extends in the forward and rearward directions between the front partition plate 27 and the rear partition plate 28 and a lower end side thereof is bolted to the right side plate 21C of the support frame 21. An upper position 29A of the intermediate partition plate 29 is configured to protrude upwards from the top plate 21D of the support frame 21 at the same height as an upper end of the front rising portion 27B of the front partition plate 27 and the upper position 28A of the rear partition plate 28. In addition, the intermediate partition plate 29 is arranged at a position opposed to the shielding member 13C of the engine cover 13 in the upward and downward directions.

The front rising portion 27B of the front partition plate 27, the upper position 28A of the rear partition plate 28, and the upper position 29A of the intermediate partition plate 29 constituting the partition member 26 thus protrude upwards from the top plate 21D of the support frame 21 constituting the heat exchanger 20. Thereby the partition member 26 partitions between the heat exchanger 20 and the engine 8. Therefore, the partition member 26 is configured to cooperate with the shielding member 13C to prevent heat (thermal air) generated in the engine 8 from being transmitted to the heat exchanger 20.

Next, the article accommodating space 30 defined in the housing cover 12 and the box supporting tool 31 provided in the article accommodating space 30 in the present embodiment will be described.

Figure 7:
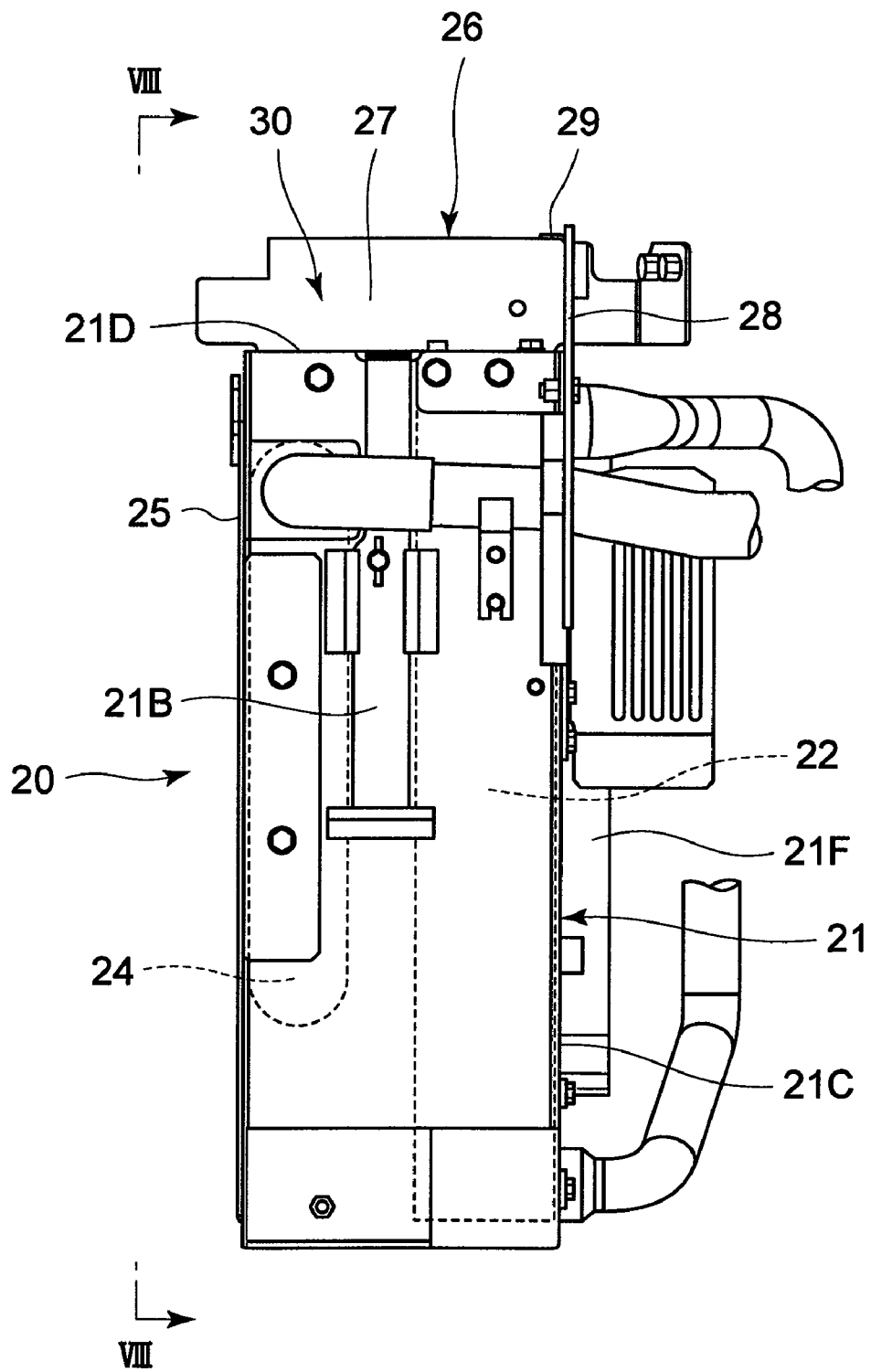
FIG. 7 is a rear view in the same position with FIG. 5 illustrating the heat exchanger, the partition member, the article box and the like in FIG. 5 by omitting a revolving frame, the engine cover, the article box and a box supporting tool.
Figure 8:
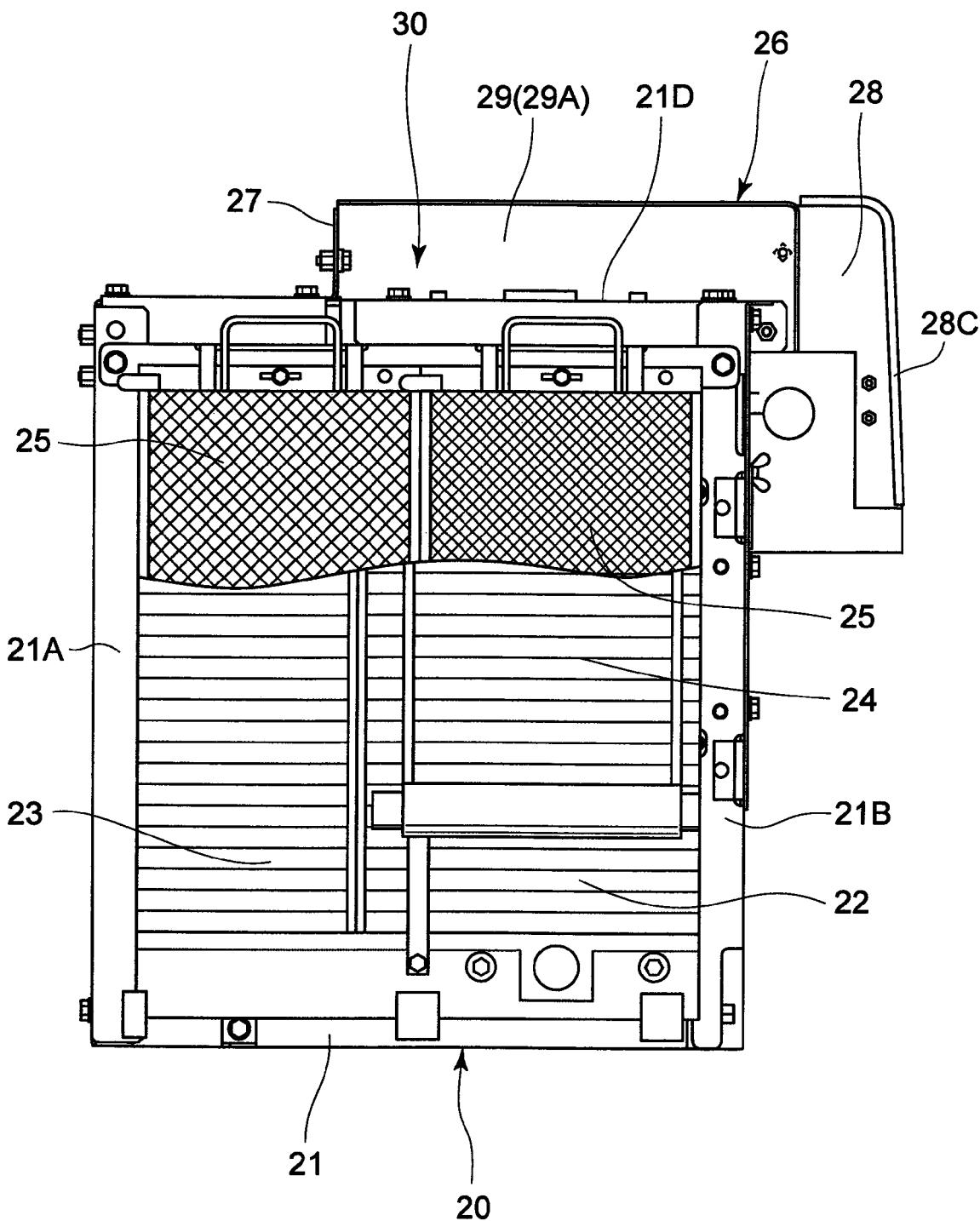
FIG. 8 is a side view illustrating the heat exchanger, the partition member, the article accommodating space and the like, taken in the direction of the arrows VIII-VIII of FIG. 7.

First, designated at 30 is the article accommodating space positioned at the upper surface side of the heat exchanger 20 and defined in the housing cover 12. The article accommodating space 30 accommodates therein an article such as an article box 32 to be described hereinafter and is, as shown in FIG. 7 and FIG. 8, configured by a space surrounded by the top plate 21D of the support frame 21 constituting the heat exchanger 20, a portion of the partition member 26, which protrudes upwards from the top plate 21D of the support frame 21, and an under surface of the top plate 13A of the engine cover 13. Accordingly, the article accommodating space 30 is spaced apart from the engine 8 by the partition member 26 and the shielding member 13C and is also positioned upstream of the engine 8 in the flow direction of the cooling air suctioned into the housing cover 12 by the cooling fan 8B of the engine 8. In addition, the article accommodating space 30 is opened and closed by the engine cover 13.

Figure 10:
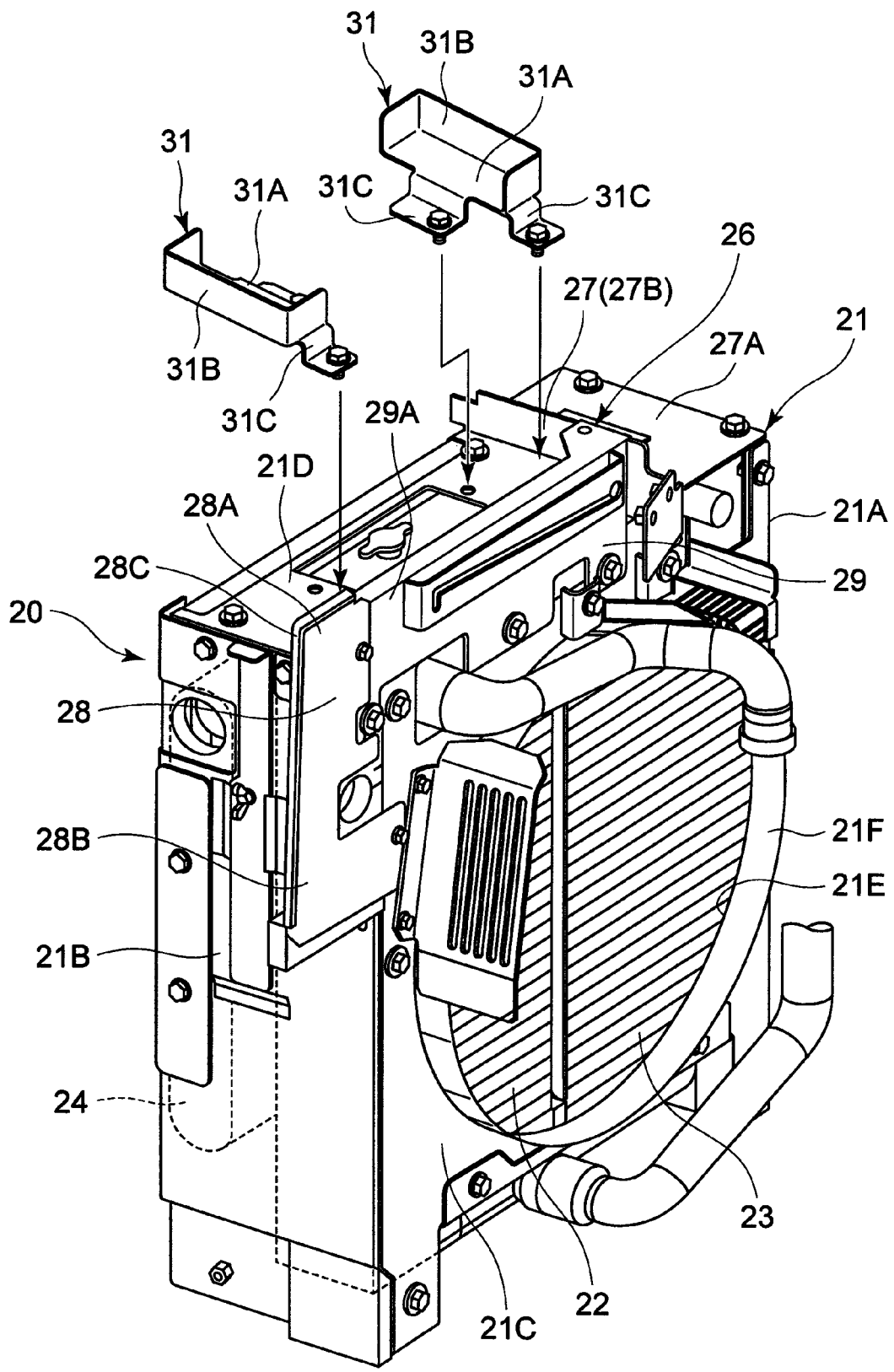
Figure 11:
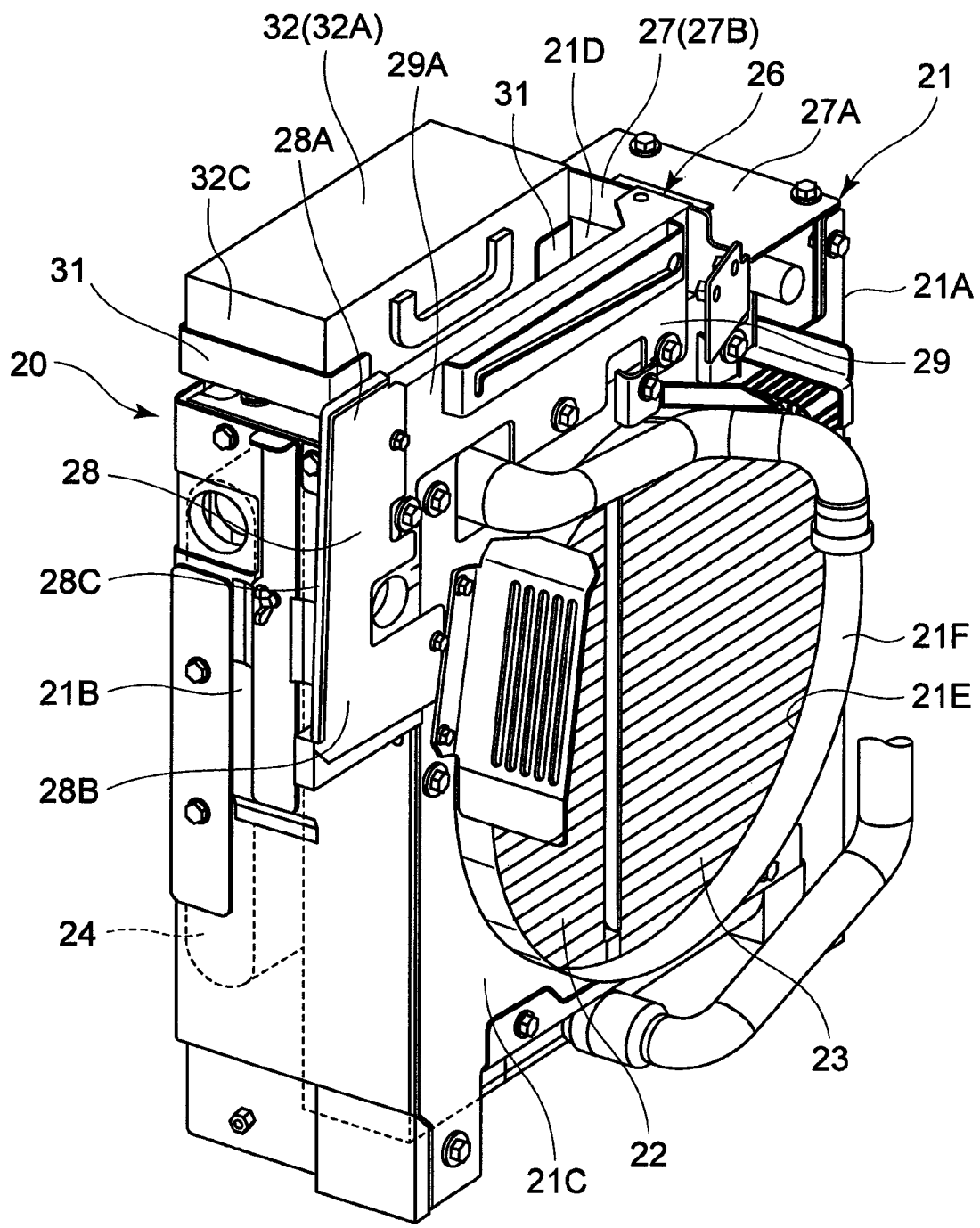

Indicated at 31 are a pair of front and rear box supporting tools provided in a portion defining the article accommodating space 30 among the top plate 21D of the support frame 21 constituting the heat exchanger 20. Each box supporting tool 31 holds the article box 32 to be described hereinafter in the article accommodating space 30. As shown in FIG. 10 and FIG. 11, each box supporting tool 31 is configured by a bottom surface 31A supporting the article box 32 from the lower side, a side wall surface 31B in a substantially U-shape rising upwards from the bottom surface 31A and surrounding the article box 32 from the outside, and a mount plate 31C protruding downwards from the bottom surface 31A.

Each box supporting tool 31 is configured such that the mount plate 31C is bolted to the top plate 21D of the support frame 21, and thereby the side wall surface 31B is fixed to the top plate 21D in a state of being opposed to each other by a certain interval in the forward and rearward directions to hold the article box 32 to be described hereinafter in such a manner as to be interposed between the front side and the rear side.

Indicated at 32 is the article box accommodated in the article accommodating space 30 in a state of being held by the box supporting tool 31. The article box 32 is formed of a rectangular formed box surrounded by a top surface 32A, a bottom surface 32B, and four side surfaces 32C. Here, various tools used for maintenance operations of, for example, the engine 8, the heat exchanger 20 and the like and articles such as a replacement component are accommodated in the article box 32.

The article box 32 is surrounded from the outside by the side wall surface 31B of each box supporting tool 31 in a state in which the bottom surface 32B is placed on the bottom surface 31A of each box supporting tool 31. Thereby the article box 32 is prevented from moving in the forward and rearward directions and in the right and left directions and is held in such a manner as to be movable in the upward and downward directions by the box supporting tools 31 without use of a fastening member.

In this case, as shown in FIG. 13, a height dimension A from the bottom surface 31A of the each box supporting tool 31 to the upper end portion of the side wall surface 31B is set larger than a gap dimension B formed between the top surface 32A of the article box 32 and the under surface of the engine cover 13 (the top plate 13A) in a state of supporting the article box 32 by the box supporting tool 31 (A>B).

Therefore, due to vibration when the hydraulic excavator 1 travels on an irregular ground or the like, even if the article box 32 moves in the upward and downward directions to the box supporting tool 31 and the top surface 32A of the article box 32 collides with the under surface of the engine cover 13, the lower end side of the article box 32 can be held in a state of being surrounded by the side wall surface 31B of the box supporting tool 31, thus preventing the article box 32 from moving out of the box supporting tool 31.

The hydraulic excavator 1 in accordance with the present embodiment has the above-described configuration, and the hydraulic excavator 1 self-travels on a working site by the lower traveling structure 2 and performs aground excavating operation of earth and sand by using the working mechanism 4 while revolving the upper revolving structure 3.

Here, before starting an excavating operation or the like by the use of the hydraulic excavator 1, maintenance operations such as inspections and maintenances in regard to the mounted equipments such as the engine 8, the hydraulic pump 9, and the heat exchanger 20 accommodated in the housing cover 12 are usually performed.

In this case, according to the present embodiment, the space surrounded by the top plate 21D of the support frame 21 constituting the heat exchanger 20, the portion of the partition member 26 for partitioning between the engine 8 and the heat exchanger 20 and protruding upwards from the top plate 21D of the support frame 21, and the top plate 13A of the engine cover 13 is defined as the article accommodating space 30 in which the article box 32 where tools necessary for maintenance operations are stored is accommodated.

In this way, even in a case where the construction machine is the hydraulic excavator 1 of a type having a small swing radius at the rearward in which the engine 8 and the counterweight 7 are arranged close to each other, it is possible to secure the article accommodating space 30 having a wide space for accommodating an article such as the article box 32 in the housing cover 12 by effectively utilizing the upper surface side of the heat exchanger 20.

Therefore, an operator moves the engine cover 13 to an open position shown in a two-dot chain line of FIG. 1, and the taking in-and-out of the article box 32 inside the article accommodating space 30 can be quickly and easily carried out in a wide space. As a result, tools necessary for maintenance operations can be quickly taken out, thus enhancing the operability of the maintenance operation such as inspections and maintenances.

In this case, since the article box 32 is accommodated in the article accommodating space 30, for example, in a state where articles such as various tools and replacement components are stored together in the article box 32, these articles can be easily taken out of and in the article accommodating space 30 in a unit of the article box 32.

On the other hand, after the maintenance operation is completed and the article box 32 is returned back into the article accommodating space 30, the locking mechanism (not shown) provided in the engine cover 13 is locked to lock the engine cover 13 in a closed position. Thereby, since the article accommodating space 30 can be covered and hidden with the engine cover 13, it is possible to securely prevent the article box 32 accommodated in the article accommodating space 30 from being stolen.

Further, the article accommodating space 30 is surrounded by the partition member 26, the upper surface side of the heat exchanger 20, and the under surface of the engine cover 13. In addition, the article accommodating space 30 is spaced apart from the engine 8 by the partition member 26 and the shielding member 13C of the engine cover 13 and is positioned upstream of the engine 8 in the flow direction of the cooling air supplied into the housing cover 12. Therefore, transmission of heat generated in the engine 8 to the article box 32 accommodated in the article accommodating space 30 can be suppressed.

Accordingly, for example, in a case of accommodating components or tools made of plastic in the article box 32, deterioration of the component made of plastic due to heat can be suppressed. Therefore, the article box 32 is not excessively heated and therefore, even immediately after the engine 8 is stopped, it is possible to easily take in and out the article box 32 accommodated in the article accommodating space 30.

On the other hand, the box supporting tool 31 is provided in a portion defining the article accommodating space 30 among the top plate 21D of the support frame 21 constituting the heat exchanger 20, and by the box supporting tool 31, the article box 32 can be stably held in the article accommodating space 30.

Thereby, even if vibration occurs when the hydraulic excavator 1 travels on an irregular ground or performs a ground excavating operation, it can be prevented that the article box 32 irregularly moves in the article accommodating space 30 and collides with the component of the heat exchanger 20 and the partition member 26. It is thus possible to protect the article box 32, the heat exchanger 20, the partition member 26 and the like from the vibration generated in the hydraulic excavator 1.

Further, according to the present embodiment, a height dimension A from the bottom surface 31A to the upper end portion of the side wall surface 31B of the box supporting tool 31 is set to be larger than a gap dimension B formed between the top surface 32A of the article box 32 held by the box supporting tool 31 and the under surface of the top plate 13A in the engine cover 13. Therefore, the article box 32 can be securely held by the box supporting tool 31. That is, for example, even if the article box 32 moves in the upward and downward directions to the article supporting tool 31 due to vibration generated when the hydraulic excavator 1 travels on an irregular ground and the top surface 32A of the article box 32 collides with the under surface of the engine cover 13 (top plate 13A), the lower end side of the article box 32 can be surrounded by the side wall surface 31B of the box supporting tool 31. Therefore, it can be suppressed for the article box 32 to move out of the article supporting tool 31.

As a result, it is not necessary to fix the article box 32 to the box supporting tool 31 by the use of a fastening member, and the article box 32 can be easily taken out of the box supporting tool 31 simply by opening the engine cover 13. Therefore, it is possible to furthermore enhance operability at the time of performing inspection and maintenance operations to mounted equipments such as the engine 8 by the use of tools accommodated in the article box 32.

Furthermore, according to the present embodiment, the shielding member 13C is provided in the under surface side of the engine cover 13 to oppose the partition member 26 in the upward and downward directions and to extend in the forward and backward directions. Therefore, the shielding member 26 and the partition member 13C can prevent the cooling air which has become high in temperature by passing through the heat exchanger 20 from flowing around into the upstream side of the heat exchanger 20.

It should be noted that in the above-mentioned embodiment, the radiator 22, the oil cooler 23, and the intercooler 24 are exemplified as heat exchange elements constituting the heat exchanger 20. However, the present invention is not limited to the particular case, for example, a capacitor for condensing a cooling medium for an air conditioner may be added as the heat exchange element. In addition, the heat exchanger 20 may be of a type where only one of the radiator and the oil cooler is mounted.

In the above-mentioned embodiment, the case has been illustrated in which the heat exchanger 20 is arranged in the left side of the engine 8. However, the present invention is not limited to the particular case, for example, the heat exchanger may be arranged in the right side of the engine. In this case, the hydraulic pump is arranged in the left side of the engine.

In the above-mentioned embodiment, the case has been illustrated in which the partition member 26 is constituted by three members of the front partition plate 27, the rear partition plate 28 and the intermediate partition plate 29. However, the present invention is not limited to the particular case, for example, the partition member formed of a single member may be adopted, or the partition member may be constituted by two, four or more members.

In addition, in the above-mentioned embodiment, the case has been illustrated in which the box supporting tool 31 is provided on the top plate 21D of the support frame 21 in the heat exchanger 20 and the article box 32 is held in the article accommodating space 30 by the box supporting tool 31. However, the present invention is not limited to the particular case, and for example, the article box 32 may be put directly on the top plate 21D of the support frame 21.

Further, in the above-mentioned embodiment, the hydraulic excavator 1 is exemplified as the construction machine, but the present invention is not limited to the particular case, and the present invention may be widely applied, for example, to other construction machines such as a hydraulic crane, a wheel loader and the like.

The invention claimed is:

1. A construction machine comprising:
an automotive vehicle body provided with a working mechanism at a front side thereof; a counterweight provided at a rear side of said vehicle body for keeping a weight balance with said working mechanism; an engine mounted on said vehicle body to be positioned in front side of said counterweight; a heat exchanger mounted on said vehicle body adjacent to said engine to cool a fluid by a cooling air; and a housing cover for accommodating mounted equipments including at least said engine and said heat exchanger therein and including an engine cover at a top surface side which is opened or closed at the time of performing a maintenance operation of said mounted equipments, further including;
a partition member being provided with said heat exchanger that partitions said engine and said heat exchanger and extends upwards over a top surface of said heat exchanger, and
a space surrounded by said partition member, a top surface side of said heat exchanger and an under surface side of said engine cover being defined as an article accommodating space.

2. A construction machine according to claim 1, wherein a suction type cooling fan, which is driven by said engine, is provided between said heat exchanger and said engine, and said article accommodating space is formed on an upstream side of said partition member in a flow direction of the cooling air.

3. A construction machine according to claim 1, wherein said article accommodating space accommodates an article box therein.

4. A construction machine according to claim 1, wherein a box supporting tool is provided in a portion at the top surface side of said heat exchanger defining said article accommodating space, and said box supporting tool supports said article box.

5. A construction machine according to claim 4, wherein said box supporting tool comprises a bottom surface supporting said article box from the lower side and a side wall surface rising up from said bottom surface to surround said article box from the outside, and
a height dimension from said bottom surface to an upper end portion of said side wall surface of said box supporting tool is set to be larger than a gap dimension formed between a top surface of said article box and an under surface of said engine cover in a state of supporting said article box by said box supporting tool.

6. A construction machine according to claim 1, wherein said heat exchanger comprises a support frame formed as a frame structure having a front surface, a rear surface, a side surface, and a top surface, and a heat exchange element provided in said support frame, and said partition member is provided on said side surface of said support frame adjacent to said engine to protrude upwards over said top surface.

7. A construction machine according to claim 1, wherein a shielding member is provided in an under surface side of said engine cover at a position opposing said partition member to extend in forward and rearward directions, and said shielding member and said partition member cooperate with each other to shield between said engine and said heat exchanger.

* * * * *